(12) United States Patent
Onodera et al.

(10) Patent No.: US 7,992,383 B2
(45) Date of Patent: Aug. 9, 2011

(54) METHOD FOR CONTROLLING EXHAUST GAS PURIFICATION SYSTEM AND EXHAUST GAS PURIFICATION SYSTEM

(75) Inventors: Takao Onodera, Fujisawa (JP); Takashi Haseyama, Fujisawa (JP); Yoshinobu Watanabe, Fujisawa (JP); Takuro Iwashita, Fujisawa (JP); Kenji Hagio, Fujisawa (JP); Tatsuo Mashiko, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 443 days.

(21) Appl. No.: 12/223,443

(22) PCT Filed: Jan. 10, 2007

(86) PCT No.: PCT/JP2007/050165
§ 371 (c)(1),
(2), (4) Date: Jul. 31, 2008

(87) PCT Pub. No.: WO2007/088715
PCT Pub. Date: Aug. 9, 2007

(65) Prior Publication Data
US 2009/0025372 A1    Jan. 29, 2009

(30) Foreign Application Priority Data
Feb. 1, 2006 (JP) .................................. 2006-024644

(51) Int. Cl.
*F01N 3/00* (2006.01)
*F01N 3/02* (2006.01)

(52) U.S. Cl. ................ 60/297; 60/286; 60/295; 60/274; 60/291; 60/311

(58) Field of Classification Search ............... 60/286, 60/295, 274, 291, 297, 311
See application file for complete search history.

(56) References Cited

U.S. PATENT DOCUMENTS
| 2005/0050883 A1* | 3/2005 | Nishimura | 60/286 |
| 2005/0072141 A1* | 4/2005 | Kitahara | 60/297 |
| 2006/0000201 A1* | 1/2006 | Iizuka et al. | 60/286 |

FOREIGN PATENT DOCUMENTS
| EP | 1 584 807 | 12/2005 |
| JP | 04-086319 | 3/1992 |
| JP | 2004-143987 | 5/2004 |
| JP | 2005-155442 | 6/2005 |
| JP | 2005-155531 | 6/2005 |
| JP | 2005-299418 | 10/2005 |

OTHER PUBLICATIONS

International Search Report mailed Jan. 30, 2007 (International Application No. PCT/JP2007/050165, Filed Jan. 10, 2007).
The cover page of International Bulletin No. WO 2007/088714 A1 dated Aug. 9, 2007.

* cited by examiner

*Primary Examiner* — Thomas E Denion
*Assistant Examiner* — Michael Carton
(74) *Attorney, Agent, or Firm* — Staas & Halsey LLP

(57) ABSTRACT

In regeneration control, when the catalyst temperature index temperature (Tg2) using the temperature of the oxidation catalyst (12a) as an index is below a predetermined first determination temperature (Tc1), the engine speed of idling is brought to a predetermined first target engine speed (Nei1) which is higher than the engine speed of idling (Nei0) in the ordinary operation, and, further, multi-injection is carried out. On the other hand, when the catalyst temperature index temperature (Tg2) is the predetermined first determination temperature (Tc1) or above, the engine speed of idling is brought to a predetermined second target engine speed (Nei2), which is lower than the predetermined first target engine speed (Nei1) and is higher than the engine speed of idling (Nei0) in ordinary operation, and, further, post injection is carried out, followed by raising of the temperature of an exhaust gas flown into a DPF apparatus (12b) to a predetermined second determination temperature (Tc2). According to the above constitution, in the regeneration control of the DPF apparatus (12b) in an internal combustion engine (10), the regeneration can be forcibly carried out with high efficiency while enhancing the temperature rise efficiency of the exhaust gas, and, at the same time, excessive rise in the exhaust temperature, a deterioration in fuel consumption, and the occurrence of noise are suppressed.

10 Claims, 3 Drawing Sheets

METHOD FOR CONTROLLING EXHAUST GAS PURIFICATION SYSTEM AND EXHAUST GAS PURIFICATION SYSTEM

BACKGROUND OF THE INVENTION

1. Field of the Invention

The present invention relates to a method for controlling an exhaust gas purification system and the exhaust gas purification system for performing regeneration control including an exhaust gas temperature rise control accompanied with change of an engine speed of idling in order to recover a purification capacity of an exhaust gas purification device including a Diesel Particulate Filter (DPF) for purifying components in the exhaust gas in an internal combustion engine such as diesel engines.

2. Background Art

Regulations on an amount of the particulate matter (PM) exhausted from a diesel engine as well as NOx, CO, HC and the like have been tightened year by year. A technology has been developed wherein the PM is collected by a DPF to thereby reduce the PM amount exhausted to the outside. A continuous regeneration type DPF device carrying a catalyst is among them.

In this continuous regeneration type DPF device, when an exhaust gas temperature is approximately 350° C. or above, the PM collected by the filter is continuously burned and purified, and the filter is self-regenerated. However, if the exhaust temperature is low, for example, if a low exhaust temperature state such as in an idling operation, a low-load/low-speed operation, or the like of an internal combustion engine continues or the like, a temperature of the exhaust gas is low, and the temperature of the catalyst is lowered and the catalyst is not activated. Thus, oxidation reaction is not promoted, and oxidation of PM to regenerate a filter becomes difficult. Therefore, accumulation of PM on the filter continues, and clogging of the filter progresses. Thus, there emerges a problem of exhaust pressure rise caused by the clogging of the filter.

One of methods to solve such a problem is a regeneration control for forcedly burning and removing the collected PM by forcedly raising the temperature of exhaust gas when an amount of clogging of the filter exceeds a predetermined one. The method for detecting the clogging of the filter includes a method for detecting using a differential pressure at a front and back of the filter, a method for detecting by calculating a PM amount collected from an operation state of the engine from map data, etc. that is set in advance, and obtaining an amount of the accumulated PM, etc.

Then, in this regeneration control, the exhaust gas temperature rise control is conducted to raise a temperature of the exhaust gas flowing into the filter to the temperature or above at which the PM collected by the filter is burned. By this arrangement, the filter temperature is raised so as to burn and remove the PM and the filter is regenerated. This kind of exhaust gas temperature rise control includes methods of fuel injection in a cylinder (in-cylinder) such as multiple injection (multiple-stage delayed injection), or post injection (after-injection).

The multiple injection is a delayed multiple-stage injection in which the fuel is injected into the cylinder in many stages. By this multiple injection, a fuel amount simply burned in the cylinder without generating torque is increased, and the temperature of the exhaust gas exhausted from the cylinder, that is, the temperature of the exhaust gas flowing into an oxidation catalyst device can be raised to a catalyst activation temperature of the oxidation catalyst or above. The post injection is an auxiliary injection injecting at timing further delayed from the multiple injection after main injection in the in-cylinder injection. By this post injection, HC (hydrocarbon) is increased in the exhaust gas exhausted from the cylinder and the HC is oxidized by the oxidation catalyst. By this oxidation, the temperature of the exhaust gas on the downstream of the oxidation catalyst device can be raised.

On the other hand, there is a problem of oil dilution that the HC is mixed with an engine oil (lubricating oil) by the post-injection and dilutes the engine oil. From a viewpoint of a countermeasure to this problem, the forcible regeneration control is performed during idling when a vehicle is stopped and when an operation state is stable. In this control, when the PM is accumulated in a predetermined amount in the filter device, need of regeneration control of the filter device is notified to an operator (driver) by a warning means such as an alarm lamp. When the driver having received the notification stops the vehicle and presses a manual regeneration button, a manual regeneration control is started and the forced regeneration is carried out.

The oxidation catalyst device is provided in a front stage (upstream side) of the filter device in the system. The HC supplied into the exhaust gas by the post-injection is oxidized through this oxidation catalyst device. Thus, the temperature of the exhaust gas at an entrance of the filter device is increased so as to carry out the forcible regeneration.

In the exhaust temperature rise, when the temperature of the exhaust gas is low as in a low speed and low load operation state, first the temperature of the exhaust gas flowing into the oxidation catalyst device is increased not less than the catalyst activation temperature of the oxidation catalyst by performing the multi-injection. Then, after the temperature of the oxidation catalyst reaches not less than the catalyst activation temperature, the post-injection is performed in addition to the multi-injection. The HC is supplied to the oxidation catalyst device by the post-injection while maintaining the temperature of the exhaust gas not less than the catalyst activation temperature by the multi-injection. Because the HC is oxidized by the oxidation catalyst and generates heat, the exhaust gas flows into the filter device at a state of a further higher temperature. The PM accumulated in the filter device is burned by the exhaust gas with such a higher temperature, and removed.

The exhaust gas purification devices shown in Japanese Patent Application Kokai Publication No. 2004-143987 and Japanese Patent Application Kokai Publication No. 2005-155531, for example, have been proposed as this example. In these devices, the exhaust gas is kept warm by increasing the engine speed of the engine more than the engine speed in a normal idling and by throttling exhaust throttle means (exhaust brake), and at the same time, a multi-injection is performed when the temperature of the exhaust gas flowing into the oxidation catalyst device is not more than the oxidation catalyst activation temperature during the manual regeneration. With these operations, the temperature of the exhaust gas flowing into the oxidation catalyst device is increased not less than the oxidation catalyst activation temperature. After that, the forcible regeneration is further carried out through performing the post-injection. Or, the forcible regeneration is carried out by increasing the engine speed of idling based on a detected value of a temperature sensor that detects the catalyst floor temperature, and additionally, by performing exhaust throttling with an exhaust throttle valve and an after injection at the same time.

At this time, increase of the engine speed of idling more than the normal engine speed is performed in order to improve the temperature rise efficiency of the exhaust gas.

However, because the engine speed of idling is increased to the same engine speed as that of the multi-injection even when the post-injection is performed in which the exhaust temperature has already been increased to the oxidation catalyst activation temperature by the multi-injection, there have been problems that the fuel efficiency deteriorates due to this idling up and that noise is generated.

SUMMARY OF THE INVENTION

The object of the present invention is to provide a method for controlling an exhaust gas purification system and the exhaust gas purification system including an oxidation catalyst and a DPF device in order to purify PM in the exhaust gas of an internal combustion engine such as a diesel engine, in which a forcible regeneration can be performed with good efficiency while increasing the temperature rise efficiency of the exhaust gas, and at the same time, an excessive increase of the exhaust temperature, deterioration of fuel efficiency, and generation of noise can be suppressed.

A method for controlling an exhaust gas purification system according to the present invention to achieve the above-mentioned object includes an exhaust gas purification device including an oxidation catalyst device for carrying an oxidation catalyst and a diesel particulate filter device in order from a upstream side of an exhaust passage of an internal combustion engine, or an exhaust gas purification device including a diesel particulate filter device for carrying an oxidation catalyst; index temperature detection means for detecting the catalyst temperature index temperature that indexes the temperature of the oxidation catalyst, and a control device for performing regeneration control based on a detection result of the index temperature detection means in order to recover a purification capacity of the diesel particulate filter device; wherein during regeneration control when a vehicle mounted with the internal combustion engine is stopped, a first exhaust gas temperature rise control is performed to make an engine speed of idling to a predetermined first objective engine speed that is higher than an engine speed of idling in a normal operation when a catalyst temperature index temperature is lower than a first determination temperature; and a second exhaust gas temperature rise control is performed to make the engine speed of idling lower than the predetermined first objective engine speed and a predetermined second objective engine speed that is higher than the engine speed of idling in the normal operation when the catalyst temperature index temperature is not less than the predetermined first determination temperature.

The above-mentioned method for controlling the exhaust gas purification system further includes performing multi-injection in fuel injection control in an in-cylinder in the first exhaust gas temperature rise control, and at the same time, performing post-injection in addition to the multi-injection in fuel injection control in an in-cylinder in the second exhaust gas temperature rise control.

Further, the above-mentioned method for controlling the exhaust gas system includes: during the regeneration control when the vehicle mounted with the internal combustion engine is stopped, performing regeneration temperature maintaining control in which the post-injection is not performed in the fuel injection control in an in-cylinder when the filter temperature index temperature that indexes a temperature of the diesel particulate filter device is higher than the predetermined second determination temperature that is higher than the first determination temperature.

The above-mentioned method for controlling an exhaust gas purification system includes manual regeneration control in the regeneration control when the vehicle mounted with the internal combustion engine is stopped.

Preferably, the temperature of the oxidation catalyst (bed temperature) is used as a temperature for determination. However, it is difficult to directly measure for the temperature of the oxidation catalyst, and therefore, the catalyst temperature index temperature that indexes a temperature of the oxidation catalyst is a temperature that is used instead of the temperature of the oxidation catalyst. The temperature of the exhaust gas flowing into the oxidation catalyst, a temperature of the exhaust gas flowing from the oxidation catalyst, a temperature derived from both of these temperatures (average temperature, for example), etc., can be used as the catalyst temperature index temperature. Furthermore, the temperature of the exhaust gas flowing into the oxidation catalyst, the temperature of the exhaust gas flowing from the oxidation catalyst, the temperature derived from both of these temperatures can be used in an AND or an OR logic using the determination related to both of these temperatures. Moreover, the temperature of the oxidation catalyst is included in the catalyst temperature index temperature referred to as herein when the temperature of the oxidation catalyst can be measured for. Further, the oxidation catalyst activation temperature of the oxidation catalyst device (approximately 200° C. to 250° C., for example) can be used as the predetermined first determination temperature.

Further, preferably, the filter temperature index temperature that indexes the temperature of the diesel particulate filter device (DPF device) is used as the temperature for determination of the temperature of the DPF device. However, it is difficult to directly measure for the temperature of the DPF device, and therefore the filter temperature index temperature is a temperature that is used instead of the temperature of the DPF device. The temperature of the exhaust gas flowing into the DPF device, a temperature of the exhaust gas flowing from the DPF device, a temperature derived from both of these temperatures (average temperature, for example), etc., can be used as the filter temperature index temperature. Furthermore, the temperature of the exhaust gas flowing into the DPF device, the temperature of the exhaust gas flowing from the DPF device, the temperature derived from both of these temperatures can be used in an AND or an OR logic using the determination related to both of these temperatures. Moreover, the temperature of the DPF device is included in the filter temperature index temperature referred to as herein when the temperature of the DPF device can be measured for. Further, the raising temperature objective temperature of the exhaust gas (approximately 500° C. to 600° C., for example) can be used as the predetermined second determination temperature.

Further, the engine speed of idling in the normal operation refers to an objective engine speed of the engine speed of the engine at idling when the regeneration control is not performed. Further, preferably, a first objective engine speed is approximately 1.6 to 1.8 times the engine speed of idling in the normal operation, and a second objective engine speed is approximately 1.3 to 1.5 times the engine speed of idling although it depends on types of the engines, etc.

According to this method for controlling, because when the engine speed of idling is increased during the regeneration control when the vehicle is stopped, the temperature of the exhaust gas is already increased to the predetermined first determination temperature during the second exhaust gas temperature rise control in which post-injection is performed, the engine speed of idling is not needed to be increased as much as it is during the first exhaust gas temperature rise control in which the multi-injection is performed. Because of that, the engine speed of idling is decreased lower than the engine speed of idling during the first exhaust gas rise temperature control, that is, the first objective engine speed. However, because the regeneration control is being performed, the engine speed of idling is made higher than the engine speed of idling in the normal operation in order to improve the temperature rise efficiency of the exhaust gas.

Thus, deterioration of the fuel efficiency can be prevented while increasing the temperature rise efficiency, and at the same time, the generation of noise is avoided, and the regeneration control can be performed with good efficiency. That is, decrease of fuel and noise is attained by reducing the amount of increasing the engine speed of idling during the post-injection during the regeneration control more than that during the multi-injection that is not accompanied with the post-injection.

Further, the regeneration control when the vehicle mounted with the internal combustion engine is stopped is often manual regeneration control. The manual regeneration control is started at receiving an input for instruction of the regeneration start from a driver who is prompted for the regeneration start of the DPF device by warning means such as a lighting lamp when a clogging state of the DPF device exceeds a predetermined state. However, regeneration control happens when the vehicle is stopped in automatic regeneration during running, aside from the manual regeneration control.

Then, the exhaust gas purification system in the present invention to achieve the above-mentioned object includes: an exhaust gas purification device including an oxidation catalyst device for carrying an oxidation catalyst and a diesel particulate filter device in order from a upstream side in an exhaust passage of an internal combustion engine, or an exhaust gas purification device including a diesel particulate filter device for carrying an oxidation catalyst; index temperature detection means for detecting a catalyst temperature index temperature that indexes the temperature of the oxidation catalyst,; and a control device for performing regeneration control based on a detection result of the index temperature detection means in order to recover a purification capacity of the diesel particulate filter device, wherein during regeneration control when a vehicle mounted with the internal combustion engine is stopped, the control device is configured so that the control device performs a first exhaust gas temperature rise control to make an engine speed of idling to a predetermined first objective engine speed that is higher than the engine speed of idling in a normal operation when the catalyst temperature index temperature is lower than a first determination temperature, and performs a second exhaust gas temperature rise control to make the engine speed of idling lower than the predetermined first objective engine speed and a predetermined second objective engine speed that is higher than the engine speed of idling in normal operation when the catalyst temperature index temperature is not less than the predetermined first determination temperature.

Further, the exhaust gas purification system is configured so that the control device performs the multi-injection that does not accompany the post-injection in the fuel injection control in an in-cylinder in the first exhaust gas temperature rise control, and at the same time, performs the post-injection in the fuel injection control in an in-cylinder in the second exhaust gas temperature rise control.

Further, the above-mentioned exhaust gas system is configured so that the control device performs regeneration temperature maintaining control, wherein during the regeneration control when the vehicle mounted with the internal combustion engine is stopped, the post-injection is not performed in the fuel injection control in an in-cylinder when the filter temperature index temperature that indexes the temperature of the diesel particulate filter device is higher than the predetermined second determination temperature that is higher than the first determination temperature.

Furthermore, in the above-mentioned exhaust gas purification system, the control device is configured so that manual regeneration control is included in the regeneration control when the vehicle mounted with the internal combustion engine is stopped.

With these configurations, an exhaust gas purification system that can carry out the above-mentioned method for controlling the exhaust gas purification system can be provided, and the same action effect can be produced.

According to the method for controlling an exhaust gas purification system and the exhaust gas purification system of the present invention, in the exhaust gas purification system provided with an exhaust gas purification device including a DPF device to purify PM in an oxidation catalyst and an exhaust gas in an exhaust passage of an internal combustion engine such as diesel engines can suppress increase of fuel efficiency and noise due to increase of an engine speed of idling because the engine speed of idling is made to be a predetermined first objective engine speed that is higher than the engine speed of idling in a normal operation when the catalyst temperature index temperature is a low temperature, and the engine speed of idling is made to be lower than the predetermined first objective engine speed and a predetermined second objective engine speed that is higher than the engine speed of idling in the normal operation when the catalyst temperature index temperature is high during regeneration control when a vehicle is stopped.

Further, because the engine speed of idling that is increased more than that of the normal operation in order to increase the temperature rise efficiency of the exhaust gas is decreased more than that at the time when the multi-injection that is not accompanied with post-injection when the post-injection is performed during regeneration control when the vehicle is stopped, deterioration of the fuel efficiency and noise is prevented, and the temperature of the exhaust gas flowing into the DPF device can be increased effectively.

DESCRIPTION OF EMBODIMENTS

Figure 1:
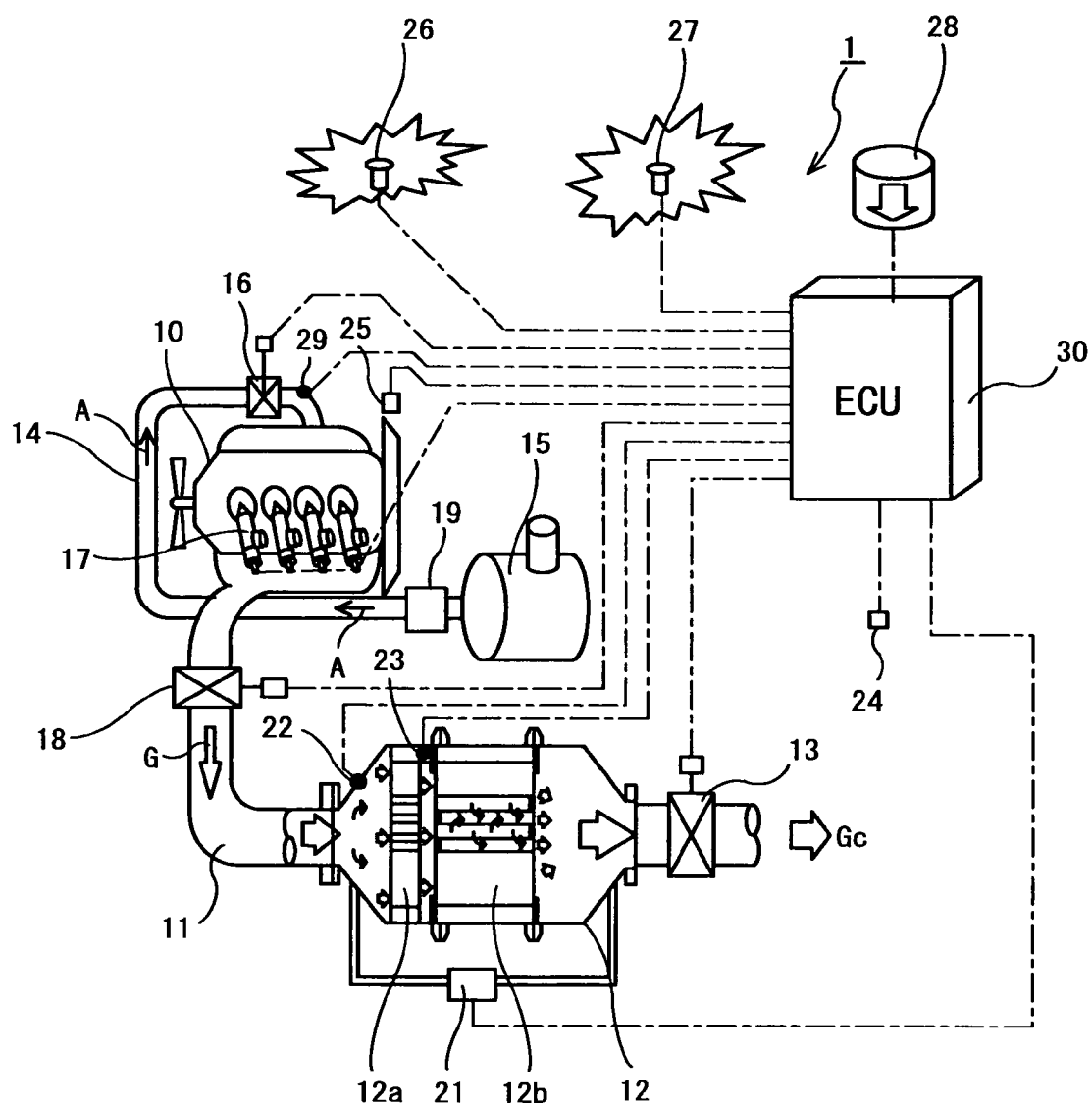
FIG. 1 is a drawing of a system configuration of an exhaust gas purification system in an embodiment according to the present invention.

Below, a method for controlling an exhaust gas purification system and the exhaust gas purification system in embodiments according to the present invention will be described by referring to the drawings.

A configuration of an exhaust gas purification system 1 according to the present embodiment is shown in FIG. 1. The exhaust gas purification system 1 is configured to provide an exhaust gas purification device 12 in an exhaust passage 11 of a diesel engine (internal combustion engine) 10. The exhaust gas purification device 12 is one of continuous regeneration type DPF (diesel particulate filter) devices, and is configured to have an oxidation catalyst device 12a in an upstream side and a filter device with a catalyst 12b in a downstream side.

Further, an exhaust brake valve 18 is provided in an upstream side of the exhaust gas purification device 12, and an exhaust throttle valve 13 is provided in a downstream side thereof. Moreover, a positional relationship of the exhaust gas brake valve 18 and the exhaust throttle valve 13 is not especially limited, and either one may be in the front as far as the front/rear position is concerned. Further, a positional relationship with the exhaust gas purification device 12 is not especially limited. However, preferably, the exhaust brake valve is arranged in the upstream side, and the exhaust throttle valve is arranged in the downstream side, considering effectiveness of the exhaust brake.

The oxidation catalyst device 12a is formed of a carrier having a honeycomb structure made of a porous ceramic for carrying an oxidation catalyst such as platinum (Pt). The filter device with the catalyst 12b is formed of a monolithic honeycomb wall flow type filter, etc. in which entrances and exits of the honeycomb channels made of a porous ceramic are alternatively sealed. A catalyst such as platinum and cerium oxide is carried in the filter part. When such a wall flow type filter is used, PM (particulate matter) in an exhaust gas G is trapped by a wall of the porous ceramic.

Then, in order to estimate an amount of the accumulated PM in the filter device with the catalyst 12b, a differential pressure sensor 21 is provided in a conduction pipe connected to the front and rear of the exhaust gas purification device 12. Further, an oxidation catalyst entrance exhaust temperature sensor (index temperature detection means) 22 is provided in an upstream side of the oxidation catalyst device 12a, and a filter entrance exhaust temperature sensor (index temperature detection means, filter temperature detection means) 23 is provided between the oxidation catalyst device 12a and the filter device with the catalyst 12b for the regeneration control of the filter device with the catalyst 12b.

The oxidation catalyst entrance exhaust temperature sensor 22 detects a first exhaust gas temperature (catalyst temperature index temperature) Tg1 that is a temperature of the exhaust gas flowing into the oxidation catalyst device 12a. Further, the filter entrance exhaust temperature sensor 23 detects a second exhaust gas temperature (catalyst temperature index temperature, filter temperature index temperature) Tg2 that is a temperature of the exhaust gas flowing into the filter device with the catalyst 12b.

Furthermore, an air cleaner 15, a MAF sensor (intake air amount sensor) 19, an intake throttle valve 16, an intake temperature sensor 29 to detect an intake temperature Ta, etc., are provided in an intake passage 14. The intake throttle valve 16 adjusts the amount of intake air A entering an intake manifold.

Output values of these sensors are input into a control device (ECU: engine control unit) 30 that performs general control of the operation of the engine 10, and at the same time, also performs the regeneration control of the exhaust gas purification device 12. The intake throttle valve 16, a fuel injection device (injection nozzle) 17, the exhaust gas brake valve 18, the exhaust throttle valve 13, an EGR valve (not shown in the figure), etc. are controlled by control signals output from a control device 30. The EGR valve is provided in an EGR passage together with an EGR cooler, and adjusts an EGR amount.

The fuel injection device 17 is connected to a common rail injection system (not shown in the figure) that temporarily stores a high-pressure fuel whose pressure has been increased by a fuel pump (not shown in the figure). Information of the vehicle speed, the coolant water temperature, etc. is input as well as information such as a degree of an accelerator opening from an accelerator position sensor (APS) 24 and the engine speed of the engine from an engine speed sensor 25. An energizing time signal is output from the control device 30 so that a predetermined amount of the fuel can be injected from the fuel injection device 17.

Further, in the regeneration control of the exhaust gas purification device 12, a flashing light (DPF lamp) 26 and an alarm 27 that are warning means and a manual regeneration button (manual regeneration switch) 28 are provided so that a driver can arbitrarily stop the vehicle and perform the regeneration control in addition to performing automatic regeneration during driving. With these warning means 26 and 27, the driver's attention is drawn when an amount of the trapped PM in the filter device with the catalyst 12b exceeds a fixed amount and the filter device with the catalyst 12b is clogged.

In the control of the exhaust gas purification system 1, the PM is trapped during normal driving. In the normal driving condition, whether it is time for the regeneration or not is monitored, and a warning or the automatic regeneration during driving is performed when it is determined to be the time for the regeneration.

Figure 2:
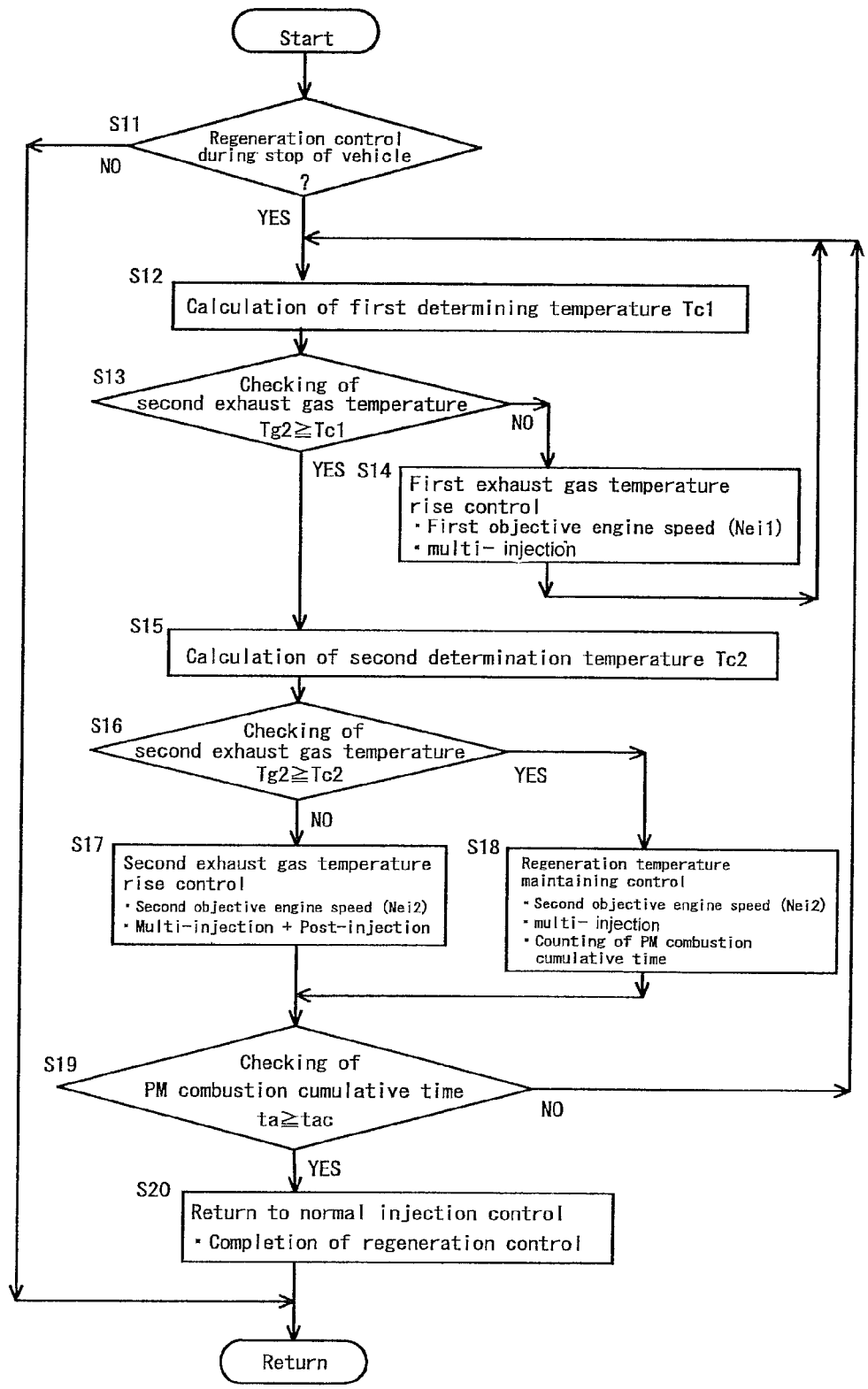
FIG. 2 is a drawing showing one example of regeneration control flow when a vehicle is stopped.
Figure 3:
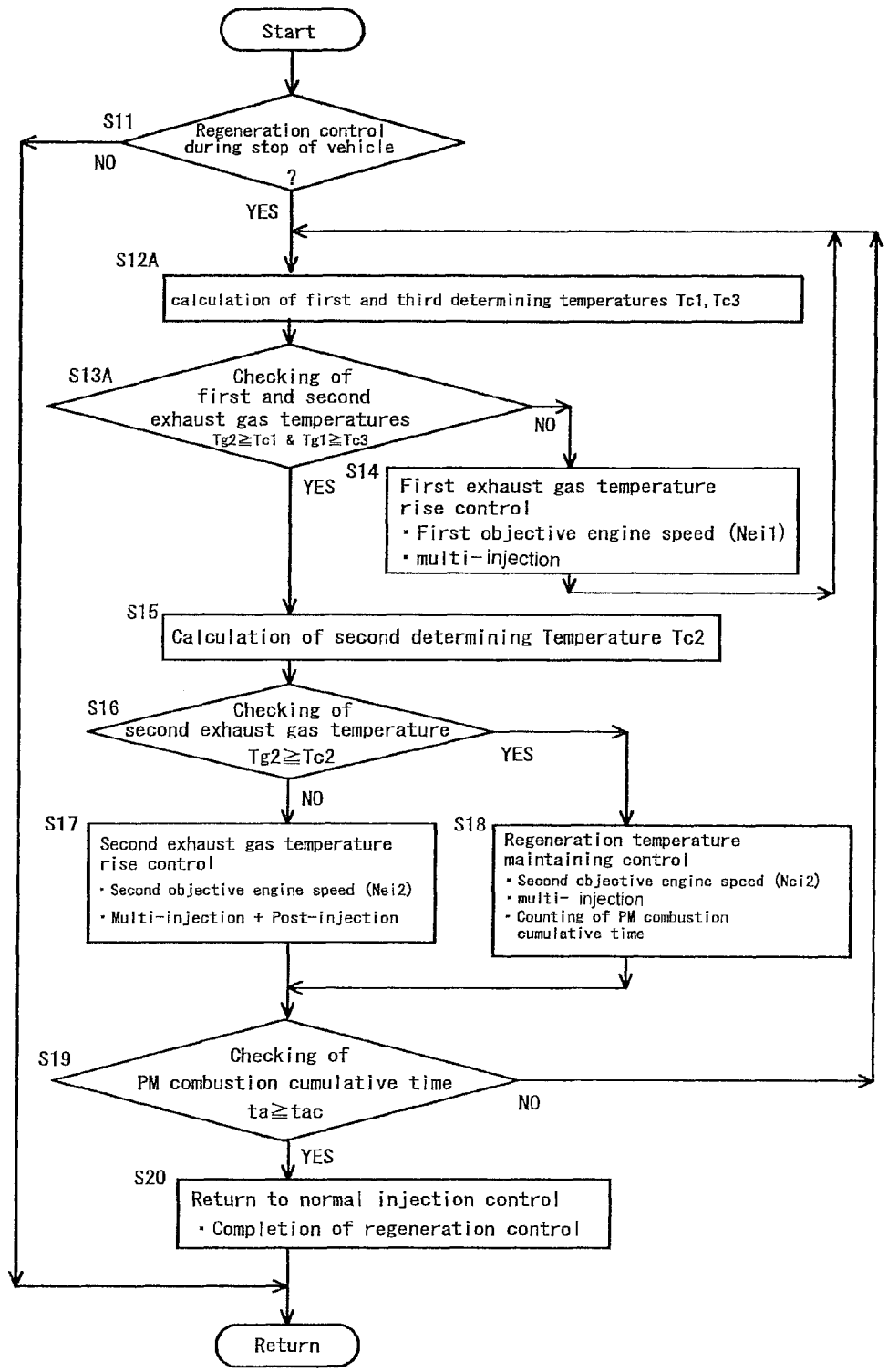
FIG. 3 is a drawing showing another example of the regeneration control flow when the vehicle is stopped.

Then, the regeneration control of the manual regeneration and automatic regeneration during driving is performed according to a control flow exemplified in FIGS. 2 and 3 according to the present embodiment. In FIG. 2, the second exhaust gas temperature Tg2 detected by the filter entrance exhaust temperature sensor 23 is used as the catalyst temperature index temperature that indexes the temperature of the oxidation catalyst (bed temperature). When the second exhaust gas temperature Tg2 reaches not less than a predetermined first determination temperature Tc1, unburned fuel is supplied to the upstream side of the oxidation catalyst device 12a with post-injection. Further, the second exhaust gas temperature Tg2 detected by the filter entrance exhaust temperature sensor 23 is used also as the filter temperature index temperature that indexes the temperature of the filter device with the catalyst 12b. When the second exhaust gas temperature Tg2 reaches not less than a predetermined second determination temperature Tc2, the regeneration temperature maintaining control is performed with multi-injection without performing the post-injection.

When the control flow of FIG. 2 starts, whether it is the regeneration control while the vehicle is stopped is determined at step S11. When it is not the regeneration control while the vehicle is stopped, it is returned without carrying out the regeneration control, and the normal driving control or automatic regeneration control during driving are performed. Further, when it is the regeneration control while the vehicle is stopped at step S11, it proceeds to step S12.

In the case of manual regeneration, whether it is the regeneration control while the vehicle is stopped or not is determined to be the regeneration control while the vehicle is stopped. In this case, the driver who is prompted to perform the manual regeneration by the flashing light 26 stops the vehicle and operates the manual regeneration button 28. Further, when it is the automatic regeneration during driving, it is determined to be the regeneration control when it is detected that the amount of the trapped PM of the filter device with the catalyst 12b exceeds a fixed amount from the detected value of the differential pressure sensor 21. When the vehicle is stopped during the regeneration control, it is determined to be the regeneration control while the vehicle is stopped. Moreover, cases until the driving is stopped and after the driving is started are excluded from the regeneration control while the vehicle is stopped.

The first determination temperature Tc1 is calculated at step S12. The first determination temperature Tc1 is a temperature (for example, approximately 200° C. to 250° C.) in which HC that is a unburned fuel supplied by the post-injection is oxidized sufficiently in the oxidation catalyst of the oxidation catalyst device 12a when the second exhaust gas temperature (catalyst temperature index temperature) Tg2 that is an exhaust gas temperature detected by the filter entrance exhaust temperature sensor 23 reaches that temperature. Further, the first exhaust gas temperature Tg1 detected by the oxidation catalyst entrance exhaust temperature sensor 22 may be used instead of the second exhaust gas temperature Tg2 detected by the filter entrance exhaust temperature sensor 23.

Checking of the second exhaust gas temperature Tg2 (catalyst temperature index temperature) is performed at step S13. When the second exhaust gas temperature Tg2 is lower than the first determination temperature Tc1 calculated at step S12, the first exhaust gas temperature rise control is performed for a predetermined period of time (time related to an interval of checking the second exhaust gas temperature Tg2 at step S13) Δt1 at step S14.

In the first exhaust gas temperature rise control, the engine speed of idling is made to be a first objective engine speed Nei1, and at the same time, the multi-injection that is not accompanied with the post-injection is performed. The first objective engine speed Nei1 is a larger value than the normal engine speed of idling Nei0. Thus, the temperature rise efficiency of the exhaust gas is improved. The first objective engine speed Nei1 is set to be approximately 1.6 to 1.8 times the normal engine speed of idling Nei0 although it depends on types of engines, etc. Further, in the first exhaust gas temperature rise control, the temperature rise property is improved by using an exhaust gas throttle and an exhaust brake together.

After step S14, it is returned to step S12. Further, when the second exhaust gas temperature Tg2 is not less than a predetermined first determination temperature Tc1 in the determination of step S13, it proceeds to step S15.

Moreover, both the second exhaust gas temperature Tg2 detected by the filter entrance exhaust temperature sensor 23 and the first exhaust gas temperature Tg1 detected by the oxidation catalyst entrance exhaust temperature sensor 22 can be used as the catalyst temperature index temperature that indexes the temperature of the oxidation catalyst. In this case, the first determination temperature Tc1 and a third determination temperature Tc3 are used as a predetermined determination temperature for both temperatures Tg2 and Tg1, respectively. When the second exhaust gas temperature Tg2 exceeds the first determination temperature Tc1 and the first exhaust gas temperature Tg1 exceeds the third determination temperature Tc3, unburned fuel is supplied by the post-injection in the upstream side of the oxidation catalyst device 12a.

In this case, step S12 and step S13 in FIG. 2 are replaced with step S12A and step S13A in FIG. 3. At step S12A, the third determination temperature Tc3 is calculated in addition to the first determination temperature Tc1.

Further, at step S13A, whether the second exhaust gas temperature Tg2 is not less than the first determination temperature Tc1 or not and whether the first exhaust gas temperature Tg1 is not less than the third determination temperature Tc3 or not are determined. Then, only when the second exhaust gas temperature Tg2 is not less than the first determination temperature Tc1 and the first exhaust gas temperature Tg1 is not less than the third determination temperature Tc3; otherwise the method proceeds to step S15, and to step S14.

At step S15, the second determination temperature Tc2 is calculated. The second determination temperature Tc2 is an objective temperature of the second exhaust gas temperature rise control at step S17. By maintaining the second exhaust gas temperature (filter temperature index temperature) Tg2 that is the temperature of the exhaust gas detected by the filter entrance exhaust temperature sensor 12 to be not less than the temperature Tc2, the combustion of PM trapped in the filter device with the catalyst 12b is maintained in a good condition. The second determination temperature Tc2 is normally made to be a higher value than a PM combustion starting temperature (approximately 350° C. for example), for example, approximately at 500° C. Further, the value of the second determination temperature Tc2 may be changed in multiple stages depending on time.

At step S16, checking of the second exhaust gas temperature (filter temperature index temperature) Tg2 is performed. When the second exhaust gas temperature Tg2 is lower than the second determination temperature Tc2, it proceeds to the second exhaust gas temperature rise control at step S17. When the second exhaust gas temperature Tg2 is not less than the second determination temperature Tc2, it proceeds to the regeneration temperature maintaining control at step S18. At step 17, the second exhaust gas temperature rise control is performed for a predetermined period of time (time related to the interval of checking the second exhaust gas temperature Tg2 at step S16) Δt2.

In the second exhaust gas temperature rise control, the engine speed of idling is made to be a second objective engine speed Nei2. The second objective engine speed Nei2 is set to be smaller than the first objective engine speed Nei1 in order to improve the fuel efficiency and the noise. However, in order to improve the temperature rise efficiency of the exhaust gas, it is set to be a larger value than that of the normal engine speed of idling Nei0. The second objective engine speed Nei2 depends on the types of the engines. However, it is set to be 1.3 to 1.5 times the normal engine speed of idling Nei0.

Then, the post-injection is performed in addition to the multi-injection, increase of the exhaust gas temperature is continued by the multi-injection, and at the same time, unburned fuel (HC) is supplied in the exhaust gas with the post-injection. The unburned fuel is oxidized in the oxidation catalyst device 12a, and the temperature of the exhaust gas is further increased by oxidization heat. When the increased temperature Tg2 of the exhaust gas reaches not less than the second determination temperature Tc2, the combustion of the PM trapped in the filter device with the catalyst 12b is promoted. Moreover, in the second exhaust gas temperature rise control, the second exhaust gas temperature Tg2 may be increased continuously to the objective temperature Tc2 of the control. Or, the temperature may be increased in two stages or multiple stages. Further, in the second exhaust gas temperature rise control, the exhaust throttle control by the exhaust brake valve 18 is also used, and the temperature rise property is improved. After step S17, the method proceeds to step S19.

Then, when the second exhaust gas temperature Tg2 is not less than the second determination temperature Tc2 in the determination at step 16, the regeneration temperature maintaining control that performs the multi-injection in injection in an in-cylinder (in a cylinder) of the engine 10 is performed for a predetermined period of time (time related to the interval of checking the second exhaust gas temperature Tg2 at step S16) Δt3.

In the regeneration temperature maintaining control, increase of the temperature of the exhaust gas is continued by continuation of the multi-injection while maintaining the engine speed of idling at the second objective engine speed Nei2. However, supply of the unburned fuel into the exhaust gas is stopped by stopping the post-injection, and increase of the temperature is controlled so that the temperature Tg2 of the exhaust gas flowing into the filter device with the catalyst 12b does not become excessively higher. With the temperature rise control of the exhaust gas, abnormal combustion in the filter device with the catalyst 12b can be prevented.

Further, at step S18, counting of the PM combustion cumulative time is performed. In this counting, the PM combustion cumulative time ts is counted only when the second exhaust gas temperature Tg2 is not less than the predetermined second determination temperature Tc2 (ta=ta+Δt3). After step S18, the method proceeds to step S19.

At step S19, checking of the PM combustion cumulative time ta is performed to determine whether the regeneration control is completed or not. In this checking, whether the PM combustion cumulative time ta exceeds a predetermined determination time Tac or not is determined. That is, when it is exceeded, it is determined that the regeneration control is completed, and the method proceeds to step S20. When it is not exceeded, it is determined that the regeneration control is not completed, and it returns to step S12. Then, until the PM combustion cumulative time ta exceeds the predetermined determination time tac, the first exhaust gas temperature rise control at step S14, the second exhaust gas temperature rise control at step S17, or the regeneration temperature maintaining control at step S18 is performed.

Then, at step S20, the regeneration control is completed, the exhaust throttle valve 13 and the exhaust brake valve 18 are returned to the normal driving state, and it returns to a normal injection control. After that, the method returns to start.

Moreover, during these controls, the start of driving the vehicle is always monitored. When driving is started, the method proceeds to the return, the control flow is suspended, and the method returns to a predetermined control such as the regeneration control during driving and the normal driving control.

With the regeneration control while the vehicle is stopped, the following control can be performed. During the regeneration control when the vehicle mounted with the diesel engine 10 is stopped, when the second exhaust gas temperature (catalyst temperature index temperature) Tg2 detected by the filter entrance exhaust temperature sensor 23, that is the temperature of the exhaust gas flowing into the filter device with the catalyst 12b, is lower than the predetermined first determination temperature Tc1, the engine speed of idling is made to be the first objective engine speed Nei1, and at the same time, the first exhaust gas temperature rise control that performs multi-injection that does not accompany post-injection is performed in the injection control in the in-cylinder. Thus, the second exhaust gas temperature Tg2 can be increased to the predetermined first determination temperature Tc1.

Then, when the temperature (catalyst temperature index temperature) Tg2 of the exhaust gas flowing into the filter device with the catalyst 12b is not less than the predetermined first determination temperature Tc1, the engine speed of idling is made to be the second objective engine speed Nei2, and at the same time, the second exhaust gas temperature rise control that performs the post-injection in addition to the multi-injection is performed in the fuel injection control in the in-cylinder. Thus, the temperature (filter temperature index temperature) Tg2 of the exhaust gas flowing into the filter device with the catalyst 12b can be increased to the predetermined second determination temperature Tc2.

Further, when the temperature (filter temperature index temperature) Tg2 of the exhaust gas flowing into the filter device with the catalyst 12b is higher than the predetermined second determination temperature Tc2, the regeneration temperature maintaining control that performs the multi-injection that does not accompany the post-injection is performed in the fuel injection control in the in-cylinder. Thus, the oxidation catalyst is kept not less than the activation temperature, and at the same time, abnormal combustion in the filter device with the catalyst 12b can be prevented.

Furthermore, until a time when the second exhaust gas temperature (filter temperature index temperature) Tg2 that is the temperature of the exhaust gas flowing into the filter device with the catalyst 12b is not less than the predetermined second determination temperature Tc2 exceeds a predetermined determination continuation time tac, the first exhaust gas temperature rise control, the second exhaust gas temperature rise control, and the regeneration temperature maintaining control are performed. Thus, the regeneration of the filter device with the catalyst 12b can be performed.

Therefore, according to the regeneration control, because the engine speed of idling is made to be high in the first exhaust gas temperature rise control that performs the multi-injection that does not accompany the post-injection when the exhaust gas is at a low temperature, the temperature rise efficiency can be improved. Further, because the amount of increasing the engine speed of idling is less than that during the first exhaust gas temperature rise control in the second exhaust gas temperature rise control that performs the post-injection when the exhaust gas is at a high temperature, an improvement of the fuel efficiency and the reduction of the noise can be attained. As a result, during the regeneration control when the vehicle is stopped, deterioration of the fuel efficiency can be prevented while increasing the temperature rise efficiency, and at the same time, noise generation can be avoided, and the regeneration control can be performed with good efficiency.

Moreover, as an example in the above-mentioned embodiment, the exhaust gas purification device of the exhaust gas purification system is described using a combination of the oxidation catalyst device in the upstream side and the filter with a catalyst (DPF) in the downstream side. However, a filter (DPF) carrying the oxidation catalyst may also be used.

Further, although descriptions have been omitted in the above-mentioned control flows in FIG. 2 and FIG. 3 in order to avoid becoming complex, generally, a configuration may also be used so as to monitor the second exhaust gas temperature (filter temperature index temperature) Tg2 all the time in order to avoid the abnormal combustion of the PM in the filter with the catalyst 12b.

A method for controlling an exhaust gas purification system and the exhaust gas purification system according to the present invention having the above-mentioned superior effects can be used extremely effectively in an exhaust gas purification system including an exhaust gas purification device including an oxidation catalyst device carrying an oxidation catalyst and a DPF device in order from the upstream side in an exhaust passage of an internal combustion engine or an exhaust gas purification device including a DPF device carrying an oxidation catalyst.

What is claimed is:
1. A method for controlling an exhaust gas purification system, comprising:
an exhaust gas purification device including an oxidation catalyst device for carrying an oxidation catalyst and a diesel particulate filter device in order from an upstream side in an exhaust passage of an internal combustion engine, or an exhaust gas purification device including a diesel particulate filter device for carrying an oxidation catalyst;
index temperature detection means for detecting a catalyst temperature index temperature that indexes the temperature of the oxidation catalyst;
a control device for performing regeneration control based on a detection result of the index temperature detection means in order to recover a purification capacity of the diesel particulate filter device, wherein during regeneration control when a vehicle mounted with the internal combustion engine is stopped,
a first exhaust gas temperature rise control is performed to make an engine speed of idling to a predetermined first objective engine speed that is higher than the engine speed of idling in a normal operation when a catalyst temperature index temperature is lower than a first determination temperature, and
a second exhaust gas temperature rise control is performed to make the engine speed of idling lower than the predetermined first objective engine speed and a predetermined second objective engine speed that is higher than the engine speed of idling in the normal operation when the catalyst temperature index temperature is not less than the predetermined first determination temperature.

2. The method for controlling the exhaust gas purification system according to claim 1, wherein multi-injection is performed with fuel injection control in an in-cylinder in the first exhaust gas temperature rise control, and post-injection is performed in addition to the multi-injection with the fuel injection control in the in-cylinder in the second exhaust gas temperature rise control.

3. The method for controlling the exhaust gas system according to claim 2, wherein during the regeneration control when the vehicle mounted with the internal combustion engine is stopped, regeneration temperature maintaining control is performed in which the post-injection is not performed with the fuel injection control in the in-cylinder when a filter temperature index temperature that indexes a temperature of the diesel particulate filter device is higher than the predetermined second determination temperature that is higher than the first determination temperature.

4. The method for controlling the exhaust gas purification system according to any one of claims 1 to 3, wherein manual regeneration control is included in the regeneration control when the vehicle mounted with the internal combustion engine is stopped.

5. An exhaust gas purification system comprising:
an exhaust gas purification device including an oxidation catalyst device for carrying an oxidation catalyst and a diesel particulate filter device, in order from an upstream side in an exhaust passage of an internal combustion engine, or an exhaust gas purification device including a diesel particulate filter device for carrying an oxidation catalyst;
an index temperature detector for detecting a catalyst temperature index temperature that indexes a temperature of the oxidation catalyst; and
a control device for performing regeneration control, when the internal combustion engine is stopped, based on a detection result of the index temperature detector in order to recover a purification capacity of the diesel particulate filter device,
wherein the control device includes
a first exhaust gas temperature rise controller to raise the exhaust gas temperature to a catalyst activation temperature of the oxidation catalyst, or above, and to make an engine speed of idling to a predetermined first objective engine speed that is higher than the engine speed of idling in a normal operation, when the detected catalyst temperature index temperature is lower than a first determination temperature, and
a second exhaust gas temperature rise controller to raise the exhaust gas temperature to a particulate matter combustion starting temperature, or above, and to make the engine speed of idling lower than the predetermined first objective engine speed and a predetermined second objective engine speed that is higher than the engine speed of idling in normal operation, when the catalyst temperature index temperature is not less than the predetermined first determination temperature.

6. The exhaust gas purification system according to claim 5, wherein the control device performs multi-injection that does not accompany post-injection with fuel injection control in an in-cylinder, when the first exhaust gas temperature rise controller makes the engine speed of idling to the predetermined first objective engine speed, and performs post-injection with the fuel injection control in the in-cylinder, when the second exhaust gas temperature rise controller makes the engine speed of idling lower than the predetermined first objective engine speed.

7. The exhaust gas system according to claim 6, wherein during the regeneration control when a vehicle mounted with the internal combustion engine is stopped, the control device performs regeneration temperature maintaining control in which post-injection is not performed with the fuel injection control in the in-cylinder when a filter temperature index temperature that indexes a temperature of the diesel particulate filter device is higher than the predetermined second determination temperature that is higher than the first determination temperature.

8. The exhaust gas purification system according to any one of claims 5 to 7, wherein the control device includes manual regeneration control in the regeneration control when the vehicle mounted with the internal combustion engine is stopped.

9. The exhaust gas purification system according to claim 5, wherein the predetermined first objective engine speed is 1.6 to 1.8 times greater than the engine speed of idling in normal operation.

10. The exhaust gas purification system according to claim 5 wherein the predetermined second objective engine speed is 1.3 to 1.5 times greater than the engine speed of idling in normal operation.

* * * * *